Dec. 6, 1960  M. A. GAARE  2,962,829
COFFEE INGREDIENT INDICATING DEVICE
Filed May 7, 1958
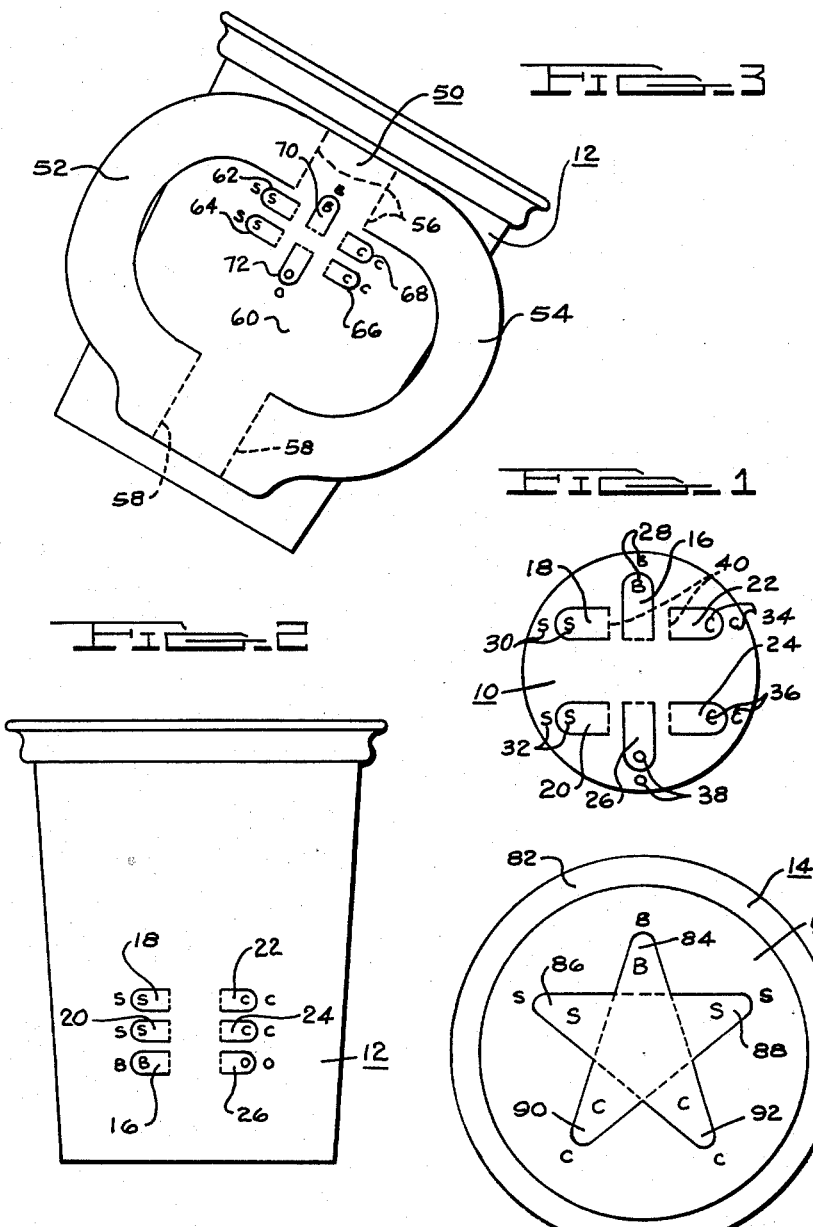
INVENTOR.
MELVIN A. GAARE
BY United States Patent Office 2,962,829
Patented Dec. 6, 1960

2,962,829

COFFEE INGREDIENT INDICATING DEVICE

Melvin A. Gaare, 610 E. Farnum, Royal Oak, Mich.

Filed May 7, 1958, Ser. No. 733,734

3 Claims. (Cl. 40—324)

This invention relates to a disposable beverage carrying container and more particularily to a container having a series of legend carrying tabs which may be selectively dislodged to indicate the ingredients of the beverage in the container.

It is common practice to use a disposable container formed of cardboard or other suitable material to transport coffee and other beverages from a restaurant or other shop to a place where it is consumed. Personal preferance dictates a wide range of flavoring ingredients for use in coffee. For example some people prefer their coffee black or without any flavoring ingredients. Others prefer it with single or double spoonfuls or portions of sugar. Others like it with single or double measures of cream, while still others prefer it with single or double portions or measures of sugar and cream, or a single portion or measure of one and double portions or measure of the other. Currently it is common practice to mark the cover or container with legends to indicate the flavoring contents of the coffee in the container. This practice is time consuming and results in confusion because of difficulties in writing legibly on the surface of the container or lid. Unsanitary practices may also result because of the necessity of increased handling of the container or lid.

An object of my invention is to provide a simplified system of indicating the flavoring content of coffee in a disposable container.

A further object of my invention resides in the provision of a series of tabs which may be selectively dislodged to indicate the nature of the contents of the container, or the flavoring ingredient used therein.

Another object is to provide an improved method of indicating the flavoring content of coffee in a disposable container by placing on the container or on the cover thereof a series of selectively manipulatable tabs having associated legends to indicate the flavoring ingredients of the coffee, as for example a tab to indicate black coffee, and other tabs to indicate single or double portions or measures of sugar and cream.

Yet a further object of my invention resides in the provision of a beverage container having a plurality of deformable tabs having associated therewith appropriate legends to indicate the contents of the container.

Other objects and advantages of my invention will be apparent from the following detailed description considered in connection with the accompanying drawings submitted for the purposes of illustration and not intended to define the scope of the invention, reference being had for that purpose to the subjoined claims.

In the drawings wherein similar reference characters refer to similar parts throughout the several views.

Fig. 1 is a plan view of a label formed of paper or other suitable material, adapted to be secured to a container or to the cover thereof and having printed ingredient indicating legends associated with disposable tab portions.

Fig. 2 is a side elevational view illustrating a disposable container having displaceable tabs embodying my invention.

Fig. 3 is a side elevational view of a disposable container having displaceable ingredient indicating tabs formed in a handle and illustrating a modified form of my invention.

Fig. 4 is a plan view of a container cover having distortable tabs embodying my invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularily to Fig. 1 it will be noted that my invention is illustrated as embodied in a label 10 of any desired form adapted to be secured to the side of a disposable beverage container or to the cover thereof.

The label 10 may embody any desired configuration such as round, rectangular, square, diamond shape, star shape, etc. It has a plurality of selectively deformable tabs such as 16, 18, 20, 22, 24 and 26 used in association with appropriate legends 28, 30, 32, 34, 36 and 38 printed or otherwise marked on the face of the label 10 adjacent the tab to indicate the presence in the container 12 of the ingredient or flavoring material indicated by the legend when the respective tab is dislodged. For example when the tab 16 is dislodged the legend B or other appropriate legend indicated by the reference numeral 28 indicates that black coffee is in the container 12.

If only one of the tabs 18 or 20 is dislodged it would indicate for example that the contents of the container was coffee having a single portion or spoonful of sugar, as shown by the legend S identified by the adjacently positioned reference numerals 30 and 32. If both of the tabs 18 and 20 were dislodged reference to the legend S appearing adjacent each of the tabs 18 and 20 and identified by the numerals 30 and 32 would indicate that the coffee in the container 12 had two teaspoonfuls or portions of sugar.

In like manner if the tab 22 is dislodged it will be apparent by reference to the legend C identified by the numeral 34 that the coffee in the container has a single measure of cream. If the tab 24 is also dislodged it will indicate that the coffee has two measures of cream indicated by the dislodging of the second legend C identified by the reference numeral 36.

To indicate for example that the coffee has one portion of sugar and one measure of cream, one of the tabs 18 or 20 marked with the legend S is dislodged and one of the tabs 22 or 24 marked with the legend C is dislodged. If a single portion or measure of one ingredient and double portions of the other ingredient is used, the ingredients of the coffee can be indicated by dislodging one of the tabs indicating the ingredient of which a single portion or measure is used, and dislodging both of the tabs indicating the ingredient of which two portions or measures are used.

In the formation of the label 10, which may of course be of any desired shape, the sheet of which the label is formed may be die or otherwise punched to perforate the sheet in the area of the tabs 16, 18, 20, 22, 24 and 26. The tabs 18 and 20, and 22 and 24 may if desired be perforated as indicated by the score lines 40 or be otherwise formed to weaken the material at the inner ends of the tabs for example to prevent the material from tearing all the way across to tear off the tab 22 when the tab 18 is pulled sufficiently hard to tear it off. Similarly in the form shown in Fig. 1, if needed the lower edge of the tab 16 and the upper edge of the tab 26 may be perforated to prevent the material of which the tab is formed from tearing out when the tab is pulled to dislodge it from the original location.

Where the reverse side of the label is gummed to facilitate securing it to the side of the container 12 or to the cover 14 the lower surface of the portions of the label defining the tab portions are ungummed in the area of their outer extremeties to permit them to be displaced. Where the label is formed of thin material such as paper the tabs may if desired be torn off.

Where the label is formed of heavier material such for example as thin cardboard the mere displacing of the tab from its seat will clearly indicate which of the tabs has been manipulated to indicate the ingredients of the coffee or other contents of the container.

In the embodiment illustrated in Fig. 2 the tabs 16, 18, 20, 22, 24 and 26 are formed in one layer or thickness of cardboard or other material of which the cup 12 is formed. The ends of the tabs may be dislodged from their position in alignment with the surface of the outer layer of the material of which the cup is formed. Once displaced from its original position the tabs remain deflected thus indicating the ingredients in the cup. It will of course be apparent that the tabs and the associated legends can if desired be positioned in the lid 14 in the same manner as illustrated in Fig. 2 with respect to the container 12.

Referring to Fig. 3 it will be noted that a handle forming member 50 is secured to the side of a cup 12. The handle 50 may be of any desired contour having for example two handle segments 52 and 54 pierced out of a blank having upper and lower vertically extending score lines 56 and 58 to facilitate the folding back of the handle segments 52 and 54 on the central unscored section glued or otherwise suitably secured to the side of the cup 12. It will be noted that the handle segments 52 and 54 are preferably spaced apart at the juncture with the cup as shown by the lateral spacing of the score lines 56 and 58 to provide a firm support by which the cup 12 can be gripped.

The handle forming member 50 may be provided with a plurality of spaced tabs 62, 64, 66, 68, 70 and 72 to indicate for example the presence in the coffee of a single or double spoonful or portion of sugar together with the presence of one or two measures of cream, an indication that black coffee only is in the container 12, or that some other beverage is in the container.

The use and operation of this form of my invention will be apparent from the preceding description, it being emphasized that label segments of any desired shape may be secured to the handle forming member 50 or that if desired the tabs may constitute one thickness or layer of multi-thickness material used in the formation of the handle forming member 50.

Referring to the Fig. 4 embodiment it will be noted that the label 80 adapted to be secured to the cover 82 is of round configuration and has a plurality of tabs 84, 86, 88, 90 and 92 disposed in star formation. In this embodiment the ends of the points of the star defining the tabs 84 may indicate the presence of black coffee, the tabs 86 and 88 the presence of single or double portions of sugar and the tabs 90 and 92 the persence of single and double measures of cream.

It will be apparent that legends may be placed on the tabs in lieu of or in addition to the positioning of the legends on the face of the label adjacent the tabs.

It will of course be apparent that if desired only four tabs arranged in any desired manner need be used to provide the desired indications. Two of these four tabs would have associated with them a suitable legend such as the letter S to indicate, when the tab is deflected, the presence in the coffee of one or two spoonfuls or portions of sugar. The other two of the four tabs would have associated with them a suitable legend such as the letter C to indicate, when the tab is deflected, the presence in the coffee of one or two measures of cream. When none of the four tabs are deflected an indication is given that coffee having no sugar and cream is in the container, in other words black coffee.

I claim:

1. A cover formed of a plurality of thicknesses of material for an open ended container, a series of displaceable tabs formed by the outer of said thicknesses of material, and legends associated with said tabs to indicate the persence in the container of ingredients identified by legends associated with displaced tabs.

2. A cover to close the open end of a coffee carrying container, a series of at least four selectively displaceable tabs on said cover, and legends associated with said tabs to indicate the presence in the container of one or two portions of sugar and one or two measures of cream.

3. A cover to close the open end of a coffee carrying container, a series of displaceable tabs formed in the shape of a star and secured to the cover, and legends associated with the tabs to identify ingredients of the coffee, the ingredients of the coffee in the container being indicated by the displacement of tabs with which said legends are associated.

References Cited in the file of this patent
UNITED STATES PATENTS

| | | |
|---|---|---|
| 711,240 | Zaring | Oct. 14, 1902 |
| 783,401 | Curran | Feb. 21, 1905 |
| 2,791,846 | Muelberger | May 14, 1957 |
| 2,833,064 | Parker | May 6, 1958 |